Jan. 12, 1965 G. J. LAURER ETAL 3,165,720
DATA INPUT DEVICE WITH FORMAL CONTROL
Filed June 29, 1959
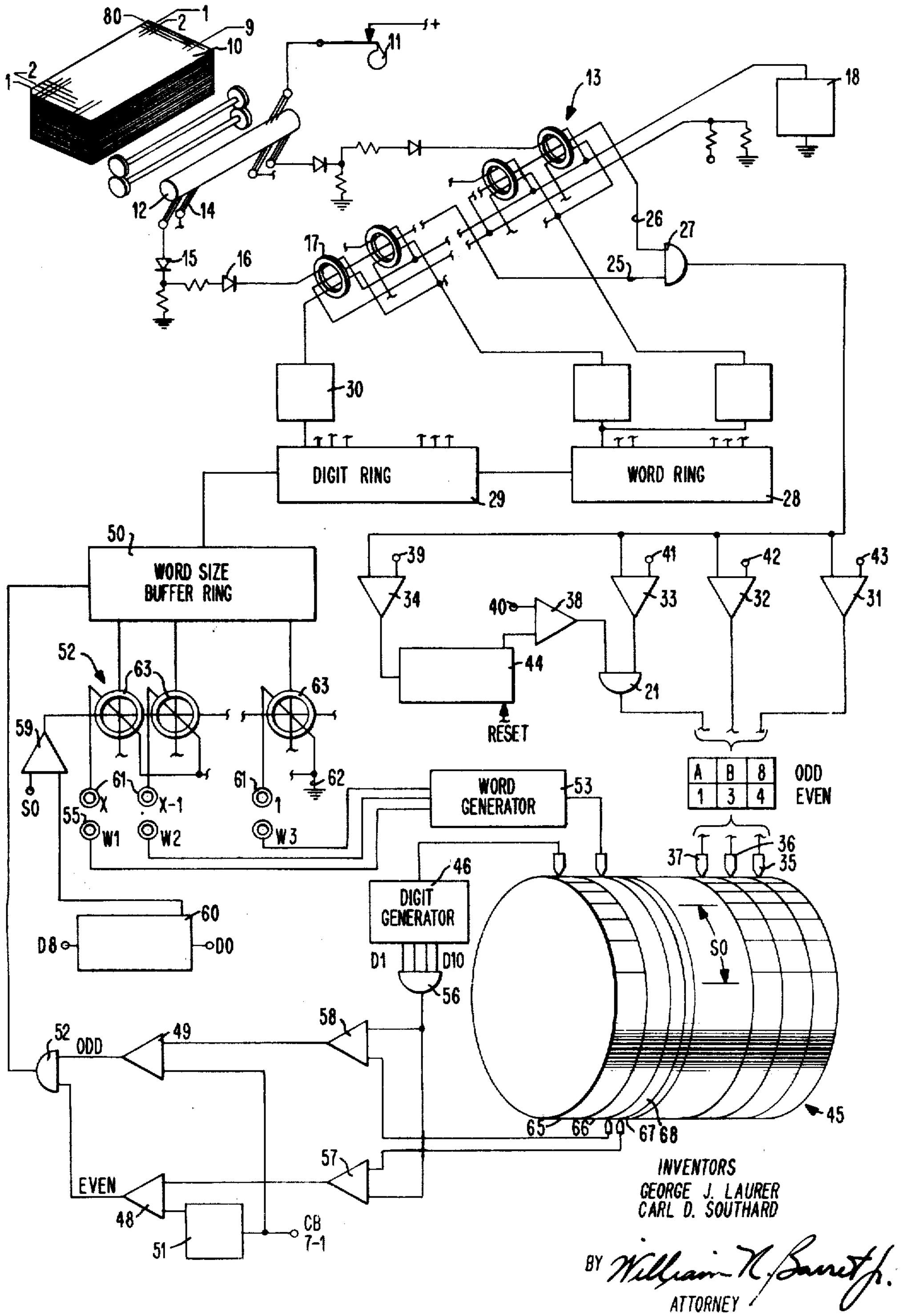
INVENTORS
GEORGE J. LAURER
CARL D. SOUTHARD
BY William N. Barret Jr.
ATTORNEY

United States Patent Office 3,165,720

Patented Jan. 12, 1965

3,165,720

DATA INPUT DEVICE WITH FORMAL CONTROL

George J. Laurer, Johnson City, and Carl D. Southard, Endwell, N.Y., assignors to International Business Machines Corporation, New York, N.Y., a corporation of New York Filed June 29, 1959, Ser. No. 823,747
2 Claims. (Cl. 340—172.5)

The present invention relates to an apparatus for entering data represented by a combinational series of indications onto a storage device having storage areas available for said data at successive intervals of time. In particular, this invention relates to an apparatus for reading data contained in record cards as punched holes and entering the same onto a rotating magnetic drum.

A record card of the type mentioned above and to be described hereinafter contains data as punched holes in rows and columns where each column contains a separate character or digit and the combination of holes by row in a given column represents the digit. In reading a record card of this type, it is the general practice to sense the card, row by row, and in response to any punched hole found therein generate a combination of bits or pulses for storage on the drum.

A magnetic drum used for the present invention is divided about its periphery into sectors, words, digits and fractional portions of digits. The sectors are large portions of the drum and are usually less than ten in number; the words in a sector will be numbered consecutively and each word contains twelve digit locations D*x*, D0 and D1–D10; where D*x* is timing, D0 is used for sign generally and D1–D10 are used for the storage of information.

In prior known apparatus such as that shown in the patent to C. B. Smith, Patent No. 2,798,554, each word and digit position of the area to be recorded is identified with an individual coincidence detector element in a matrix. When the area is properly located for recording a pulse is supplied as an input to the associated element. By connecting each column of a card to be sensed to a particular detector element, the coincidence of word and digit time of the drum with the detection of information in a column can be used to record information from that column in that location on the drum. With a matrix containing 80 digit places for 80 columns on a card there will be a total of eight words of ten digits each, on the drum to which these column data may be related. If the data contained in the card is not numeric, it is necessary to utilize two digit places on the drum per column of data and with everything being fixed, the maximum columns of the card which can be used for alphabetic or alphanumeric will be forty. To increase the usable space on the record card for alphanumeric data to the same as that for numerical, it would be necessary to increase the size of the distributor by a factor of two.

Other known apparatus utilizes a source of timing pulses from a pulse generator synchronized with all digit locations, for reading each column of data successively for storage at a position determined by the position of the magnetic drum in relation to the timing pulse. The inflexibility of this arrangement is in determining the position of recording for each of the column digits. While the information from the columns may be rearranged, there are only as many useful areas for recording as there are inputs since the choice in recording is merely to record or not to record.

The present invention presents an apparatus which uses a scanning arrangement as mentioned above for sensing each column successively but uses, as a timing pulse source for scanning, the word and digit pulses from the drum signifying the area under the record heads, with a format control for selectively determining where the information will be stored. This format control will determine which of the word and digit location pulses will be used for scanning and thus will allow the columns of information, i.e., digits to be recorded, to be expanded or contracted over the recording area on the drum while providing a means for determining the exact location of each recorded column.

Without attempting to oversimplify the present invention, it can be seen that what has been provided is a scan of each possible digit position of the drum in the same time that each column of the card is read so that the data contained in the card may be stored in any fashion on the drum merely by timing the scan of the card columns with the desired position into which the information is to be received to provide the advantage of utmost flexibility at substantially less cost.

It is an object of this invention to provide a data input device for a storage device having storage areas available in successive intervals of time in which the data may be selectively located in any particular storage area.

It is a further object of the present invention to provide a data input device for a storage device having storage areas available in successive intervals of time in which the data and the storage location for the same are determined by selectively transmitting the data indications for successive intervals of time.

It is another object of this invention to provide a data input device having data available successively for a storage device having storage areas available in cyclic intervals of time in which a format control is provided for determining the time sequence of the data input with relation to the time sequence of said storage areas.

It is still another object of the present invention to provide a card reading device for a rotating magnetic storage drum in which the storage of characters in a card may be accomplished without relating the word and digit time of the drum to particular characters.

The foregoing and other objects, features and advantages of the invention will be apparent from the following more particular description of a preferred embodiment of the invention, as illustrated in the accompanying drawing.

In the drawing:

The figure is a schematic illustration of the invention.

A card 10, containing eighty columns of data coded in twelve rows, is shown being sensed by brushes 14. As each row of data passes beneath brushes 14, any data in the form of punched holes is stored in a core buffer 13 prior to transmittal to a magnetic drum 45. The apparatus for transferring the information, from cores 17 contained in buffer 13 for each row of information, are digit and word drivers 29 and 28 which serially reset each magnetic core 17 to the zero state. All cores which have been set to a first state by the presence of a hole in the card will generate a pulse when reset.

The magnetic drum 45 has a plurality of digit locations each of which contains six bit positions. Each digit location is referable by a particular time pulse generated by a plurality of timing tracks 65–68 located adjacent the digit storage locations as the recorded time signals pass adjacent reading heads is shown. The pulses are generated and transmitted to a word size buffer ring 50. The word size buffer ring 50 controls how many of the pulses originating from a word a generator 53 and a digit generator will be transferred to the word and digit rings 29 and 28 for scanning the core buffer 13.

Each row of the card is sensed successively and transferred to the magnetic core buffer storage 13 which is serially scanned by column. The position of each word and digit locations on the drum beneath the recording heads 35–37 are indicated by a series of pulses which originate from timing tracks 65–68 carried on the drum. A buffer ring 50 is utilized as a format control to determine whether or not, each individual pulse indicating the presence of a particular word and digit position beneath recording heads 35–37 will be transmitted to word and digits rings 29 and 28 to scan the information stored in the magnetic core buffer 13. By a selective operation of the word size buffer ring, information in a given card column can be selectively stored at a particular location on the drum.

A detailed description of the invention is as follows. A circuit breaker 11 is used to furnish potential to a contact roll 12 at each row time to which card sensing brushes 14 many complete a circuit to allow information present in that row to be transferred to a core buffer 13. While brushes are illustrated as the means for sensing the information in each row of the card, it is to be understood that other forms of sensing, e.g., photoelectric, may be used if desired. When the circuit breaker 11 is closed, during the sensing of a row of information on a card 10 passing betwen the brushes 14 and the contact roll 12, and a hole is present in a column, a circuit will be completed through diode 15 to ground and also through diode 16, through the core 17, for that particular column, to a circuit closing arrangement 18 to ground. This apparatus is shown in application Serial No. 823,671, to G. J. Laurer, filed June 29, 1959.

The magntic cores 17 are conventional in that the magnetic material used for the cores has a square hysteresis loop characteristic. When a current is passed through a winding connected through the core, the magnetization of the core will be set to one or the other of two stable states dependent upon the direction of the field induced by the current. In the present instance, the readin from the brushes is used to set the cores to a first stable state if there is a hole present in the card. When the cores are reset by the digit and word rings 29 and 28 a further set of windings 25 and 26 connected therethrough will detect the change in remanent state by the change magnetic field induced by the change in state of the core. The output windings 25 and 26 are shown connected to the OR circuit 27. It is to be understood that the actual number of windings on the cores is not shown and that the showing is entirely schematic.

The various logic circuits shown in the drawing represent conventional known configurations of circuit elements. The triangles shown represent AND circuits and respond to the occurrence of a raised signal on all lines to generate a positive output signal. The half moons represent OR circuits which transmit any positive signal which appears at the input. Core driver circuits 30 are tubes or transistors having the required power capacity for driving a magnetic core to one of its stable states. The long rectangular boxes are trigger circuits, flip-flops or latches and respond to pulses applied at one input to generate a positive voltage on one output and a negative voltage on the other output. An inverter, such as 51, is a tube, transistor, etc., which is On or Off in accordance with the input. Using an NPN transistor or vacuum tube will result in a voltage at the collector or plate of inverse characteristic to the input voltage. Ring circuits 29, 28, and 50 consist of a number of bistable elements in which one element is in a first condition while the remainder are in a second condition. By a series of timing pulses, each successive element is turned on while all others are turned off. From each element an output pulse can be obtained indicative of the operation of this particular element. An open ring is one in which one stage must be turned on before stepping can occur in the ring while a closed ring is one in which a connection is made from the last stage to the first stage to provide a continuous cyclic operation. Rings 28 and 50 are open while ring 29 is closed.

The scanning arrangement for the core buffer 13 consists of a ring 28 and a ring 29. Each element of the ring 28 is connected through ten of the cores as a word group while each element of the digit ring is connected through 10 individual cores, one in a word group. When the connection from an element of the digit ring and the connection from an element in the word ring are both carrying current indicating each element is in an On condition, the core having these two currents passing therethrough is biased sufficiently to be reset to a magnetic state indicative of a zero condition. If the core was not initially set by a punch in the card, the reset pulse would not have any effect on the magnetic state of the core.

The card code designations for various character and the drum code for the same characters is illustrated below:

| Character | Card | | | | | | | | | | | | Drum | | | | | |
|---|---|---|---|---|---|---|---|---|---|---|---|---|---|---|---|---|---|---|
| | 12 | 11 | 0 | 1 | 2 | 3 | 4 | 5 | 6 | 7 | 8 | 9 | A | B | 1 | 3 | 4 | 8 |
| A | 12 | | | 1 | | | | | | | | | | B | 1 | | | |
| B | 12 | | | | 2 | | | | | | | | | B | 1 | 3 | | |
| C | 12 | | | | | 3 | | | | | | | | B | | 3 | | |
| J | | 11 | | 1 | | | | | | | | | A | | 1 | | | |
| K | | 11 | | | 2 | | | | | | | | A | | 1 | 3 | | |
| L | | 11 | | | | 3 | | | | | | | A | | | 3 | | |
| S | | | 0 | | 2 | | | | | | | | A | B | 1 | 3 | | |
| T | | | 0 | | | 3 | | | | | | | A | B | | 3 | | |
| U | | | 0 | | | | 4 | | | | | | A | B | | | 4 | |
| & | 12 | | | | | | | | | | | | | B | | | | |
| - | | 11 | | | | | | | | | | | A | | | | | |
| / | | | 0 | 1 | | | | | | | | | A | B | 1 | | | |
| 1 | | | | 1 | | | | | | | | | | | 1 | | | |
| 2 | | | | | 2 | | | | | | | | | | 1 | 3 | | |
| 8 | | | | | | | | | | | 8 | | | | | | | 8 |
| 9 | | | | | | | | | | | | 9 | | | 1 | | | 8 |
| . | 12 | | | | | 3 | | | | | 8 | | | B | | 3 | | 8 |
| $ | | 11 | | | | 3 | | | | | 8 | | A | | | 3 | | 8 |
| * | | 11 | | | | | 4 | | | | 8 | | A | | | | 4 | 8 |
| % | | | 0 | | | | 4 | | | | 8 | | A | B | | | 4 | 8 |

It can be seen that the designations in a column of information in a card can consist of one, two or three holes to indicate three entirely different types of characters. That is, numeric, alphabetic or special characters. The code designation on the drum consists of A, B, 1, 3, 4, 8. Data is stored on the drum, as shown, in two successive digit positions designated ODD and EVEN.

To record at the proper time, the data in core buffer 13 must be read at the proper time; i.e., A, B, 8 are recorded at different times from 1, 3, 4. The information from the core row buffer 13 is transmitted through the OR circuit 27 to a series of AND circuits 31–34 which determine which of the three tracks of the drum the information will be recorded. An emitter, not shown which is a commutator arrangement is mechanically connected to the sensing station to generate signals indicative of the row being sensed. Emitters are well known and can be seen in the above-mentioned patent to Smith. To each of the AND circuits 31–34, a signal is transferred from the emitter to code the data from the row buffer 13 as follows: an input 43 for AND 31 receives emitter pulses for each of card rows 9–4 to supply a signal to recording head 35 when a hole in the card column and row being sensed at that time is present. With reference to the above chart, it can be seen that for the digits punched in rows 9–4 it will be necessary to have either an 8 or a 4 bit placed on the drum. Therefore, for each occurrence of a 9, 8, 7, 6, 5, or 4 punch in the card, a bit will be placed in either the 8 or 4 bit position on the drum. An input 42 for AND circuit 32 supplies row pulses at 7, 6, 3, 2, 12 and 0 time to gate pulses to record head 36. These are the times in which either a B bit or 3 bit is to be recorded. The AND circuit 33 receives, at input 41, row pulses at 6, 5, 2, 1 and 11 time to place a pulse in either the A or the 1 position through OR circuit 21. For a 9 punch which is a 1 bit and an 8 bit, which are in different timed portions on the drum, it is necessary that a pulse from the nine row be recorded in two places. A row pulse on input 39 of AND 34 operates a trigger circuit 44 to condition AND circuit 38. The input at 40 to AND 38 is the timing for an even pulse digit location so that a recording will be made at the "1" bit position. The trigger circuit 44 is reset by a connection as shown.

The apparatus for generating word and digit position pulses, and the odd and even pulse for these word and digit position pulses includes a digit generator 46 which generates a pulse on one of its output D1–D10 for each digit position. The even and odd digit position pulses are obtained from tracks 67 and 68 on the drum 45 and timed with digit pulses from AND circuits 57 and 58 to supply odd pulses to AND circuit 49 and even pulses to AND 48 for each digit position. The two AND circuits 48 and 49 are used with the CB emitter 7–1 to generate either odd or even bit digit bits for particular row times on the output of an OR circuit 52 connected to ring 50. An inverter 51 used between the AND circuit 48 and CB timer inhibits AND circuit 48 for rows 7, 6, 5, 4, 3, 2 and 1 while enabling AND 49 to produce odd digit timing pulses. AND circuit 48 is enabled at the remaining CB times. Reference to the preceding chart indicates that pulses denoting row positions 7–1 can be used for the gating of even and odd digit pulses for each particular row to separate data into its respective bit positions. The digit "9" which is indicated by a bit in both the odd and even positions is taken care of in the even position by AND 38, discussed previously.

The obvious purpose of separating the odd and even timing digits for transmittal to the scanning rings 28 and 29 is to effect the proper timing of data from buffer 13 to the drum. It is apparent that the even digits transmitted periodically will have a certain spacing between them or have a certain time occurrence with relation to the movement of the drum so that when the core buffer is pulsed in accordance with the even digits, they will be placed in the even digit positions and the odds will be placed in their particular position. Therefore, parallel and horizontal division of each digit place has been effected by means of the timing generator and the translation device corresponding to the row then being sensed.

A format control means including the buffer ring 50 and core array 52 is supplied by the odd and even digit pulses and pulses from word generator 53. Both the digit generator 46 and the word generator 53 are shown in application Serial No. 544,520 to F. E. Hamilton et al., now Patent No. 2,959,351, and include means for generating signals on a particular output indicating a particular word and digit then present under the record heads. The buffer ring 50 would have an OR circuit included therein to OR pulses from each stage but this has not been shown.

The word size buffer ring 50 is a ring circuit having a number of stages equal to the digit positions of a word so that the required number of pulses can be obtained for each word on the drum 45. The odd and even digit pulses from the drum are used to drive the buffer ring from a set position to the last position of the ring.

A core array 52 is used as the output for the word generator 53. As the words in a secton S0 pass beneath the recording heads 35–37, a raised voltage will appear on an associated word hub 55, labeled for only three words, but which in the ordinary instance would include many more. This raised voltage will set the core 63 associated with the winding attached to the plug 61, labeled 1, $x$–1, $x$, if connected by a plug wire (not shown) from a word hub 55, labeled W1, W2, etc. This is to provide a control for each successive word on drum 45.

After a core 63 is set and used to control a ring 50, a trigger 60 set by an input at time D0 is used with an AND circuit 59 having a raised voltage input during sector S0 to reset the core 61 and prepare the core buffer for the next word pulse. The reset of a core 61 provides a pulse to an associated stage in the buffer ring 50 to set the same. The digit pulses D1–D10 will then pulse the ring to zero to provide the desired number for that word. When a core 63 is reset, the stage in ring 50 connected thereto is set to an On condition. The pulses from the digit generator 46 step the ring through its last position at which time the ring must again be reset by the next word pulse.

For each particular word location on the drum, a different number of digits will be generated to determine the exact location of the data from each card column on the drum. If the number of stages in the buffer ring 50 is ten, then the "$x$" shown adjacent the hub 61 is equal to ten and "$x-1$" is equal to nine. By connecting, for instance, the word 1 hub, W1, to the "$x-1$" hub 61, the word size buffer will be set to generate nine pulses in timed relation to digit pulses D1–D9 of word 1. To obtain the desired number of pulses from the operation of buffer ring 50 to its zero condition, it is necessary to set the stage in ring 50 which is the complement of the desired number. This is shown in the drawing where "$x$" which is the first plug hub 61 is connected to the first stage of the ring 50, through core 63, while "1" which is the last plug hub is connected to the last stage of the ring. If the ring is to be pulsed to zero from the first to last stage, the maximum number of output pulses will be obtained by collecting the output pulses from each stage being turned Off beginning at the first stage. In a like manner, if only one pulses is desired, the last stage should be the one turned On since a single advance pulse will complete the cycle of the ring.

The word size buffer ring and its particular circuitry is a format control in the broad sense of the word in that the positions of the drum into which the information is to be transmitted and the scanning arrangement of the card are synchronized so that the data contained in the card may be selectively spread over the entire arrangement.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus for reading records wherein data is stored in columns by combinatorial row indications to indicate predetermined characters, comprising means for sensing said records by row, buffer storage means operable to record said indications by row, enabling means for sequentially reading the columns of row indications from said buffer storage, a storage device having successively available storage locations for receiving said row indications, each said storage location having a first and a second successively available substorage location, timing means for said storage location for determining the location then available for receiving said row indications, said timing means including a first and second pulse generator operable to provide pulses indicative of the availability of a first or second storage location in accordance with the row then being sensed, format control means utilizing said pulses for timing said enabling means in order to record successive rows of data indications in first or second storage locations, said storage locations being divided into parallel tracks and further including translating means for recording said data indications in predetermined parallel tracks in accordance with the row then being sensed, said storage locations also being divided into groups of words, said timing means including word generating means indicating the availability of a particular word wherein the word generating means is connected to said format control, and wherein said format control includes a ring circuit having a number of stages equal to the number of storage locations into which said data indications are to be placed and having an advance pulse line connected to said first and second pulse generator to advance said ring to a null condition, said word generator being operable to set a stage in said ring for each successive word whereby said ring will transmit pulses to said enabling means in accordance with the stage which is set to an On condition.

2. The apparatus of claim 1 in which said buffer storage is a series of magnetic cores and said enabling means is a ring circuit having successive output windings connected to successive cores to reset the same.

References Cited in the file of this patent

UNITED STATES PATENTS

| | | |
|---|---|---|
| 2,702,380 | Brustman | Feb. 15, 1955 |
| 2,910,238 | Miles | Oct. 27, 1959 |
| 2,951,234 | Spielberg | Aug. 30, 1960 |
| 2,995,729 | Steele | Aug. 8, 1961 |
| 3,000,556 | Bewley et al. | Sept. 19, 1961 |
| 3,025,499 | Evans et al. | Mar. 13, 1962 |